United States Patent [19]

Brokamp

[11] 4,212,134
[45] Jul. 15, 1980

[54] MODULAR PLANTING BOX SYSTEM INCLUDING LIQUID LEVEL AND INSERT

[76] Inventor: Hans J. B. Brokamp, Schmiedgasse 21, D-8950 Kaufbeuren, Fed. Rep. of Germany

[21] Appl. No.: 948,997

[22] Filed: Oct. 5, 1978

Related U.S. Application Data

[63] Continuation of Ser. No. 813,429, Jul. 6, 1977, abandoned.

[51] Int. Cl.² ............................................. A01G 9/02
[52] U.S. Cl. ........................................... 47/82; 47/83; 47/86
[58] Field of Search .................. 47/66, 64, 72, 82, 83, 47/79, 63, 80, 81, 86

[56] References Cited

U.S. PATENT DOCUMENTS

| | | | |
|---|---|---|---|
| 767,175 | 8/1904 | Sibole | 47/72 |
| 2,249,197 | 7/1941 | Brundin | 47/64 |
| 3,199,250 | 8/1965 | Sawyer | 47/63 |

FOREIGN PATENT DOCUMENTS

| | | | |
|---|---|---|---|
| 4005 | 5/1901 | Austria | 47/80 |
| 1960336 | 6/1971 | Fed. Rep. of Germany | 47/83 |
| 2305609 | 8/1974 | Fed. Rep. of Germany | 47/83 |
| 390253 | 10/1908 | France | 47/79 |
| 2305123 | 11/1976 | France | 47/79 |
| 276343 | 7/1951 | Switzerland | 47/79 |
| 435841 | 10/1967 | Switzerland | 47/81 |
| 587001 | 4/1977 | Switzerland | 47/66 |

Primary Examiner—Edgar S. Burr
Assistant Examiner—Steven A. Bratlie
Attorney, Agent, or Firm—Haseltine, Lake & Waters

[57] ABSTRACT

A planting box having a frame which consists of a plurality of vertical walls and being of polygonal cross-section is provided with vertical channels and vertical ribs. The channels and ribs are complementary in their cross-section. Ribs of one planting box fit into the recesses of another identical planting box, so that a planting arrangement can be erected which consists of a plurality of inter-connected identical boxes. In each channel of the planting boxes supporting shoulders are formed which support the ribs of a laterally adjacent planting box, so that each box is vertically offset with respect to any laterally adjacent box by half of the box height.

1 Claim, 5 Drawing Figures

MODULAR PLANTING BOX SYSTEM INCLUDING LIQUID LEVEL AND INSERT

This is a continuation of application Ser. No. 813,429, filed July 6, 1977, now abandoned.

From the German Utility Model No. 69 50 312 a planting box is known which consists of a frame of polygonal cross-section having vertical walls at which vertical ribs and channels are provided, said ribs and channels being complementary in their cross-sections and further being disposed in such manner that channels of one planting box form vertical sliding guides for said ribs of identical further planting boxes and vice versa.

The known planting box can be connected with further planting boxes in the same height by sliding the ribs of one planting box into the channels of another planting box. All of the coupled planting boxes lie between the same horizontal planes.

One object of the invention is to provide a planting box which is adapted for use together with a plurality of identical boxes in the formation of a stable and rigid arrangement in which the boxes are interlocked in side-by-side disposition and superposition. A further object of the invention is to provide a planting box which provides a greater variety of combinations of such arrangements. Another significant object of the invention is to provide a planting box which presents a highly decorative appearance thereby having particular utility as a means for attractively setting off various areas such as rooms, halls, galleries, gardens, etc.

Further it is an object of the instant invention to provide a planting box which can be quickly and easily erected utilizing unskilled labor.

Another object is to provide a planting box which can be connected with an adjacent planting box in side-by-side position vertically offset by half of the height of the planting boxes respectively.

The invention consists in that in each of the channels of the planting box supporting means are provided on which the rib of an adjacent planting box is supported which is vertically offset with respect to the first planting box by substantially one half of the height of the planting box.

By connecting two superposed planting boxes by at least one adjacent vertically offset planting box a great stability of a planting box arrangement is achieved, which might have a great height and for example can consist of columns and bridges with an overall height of 40 planting boxes or more. The arrangements are non-shaky and the danger is avoided that some planting boxes could be displaced with respect to other boxes of the column.

The drawings show two examples of the new planting boxes.

Figure 1:
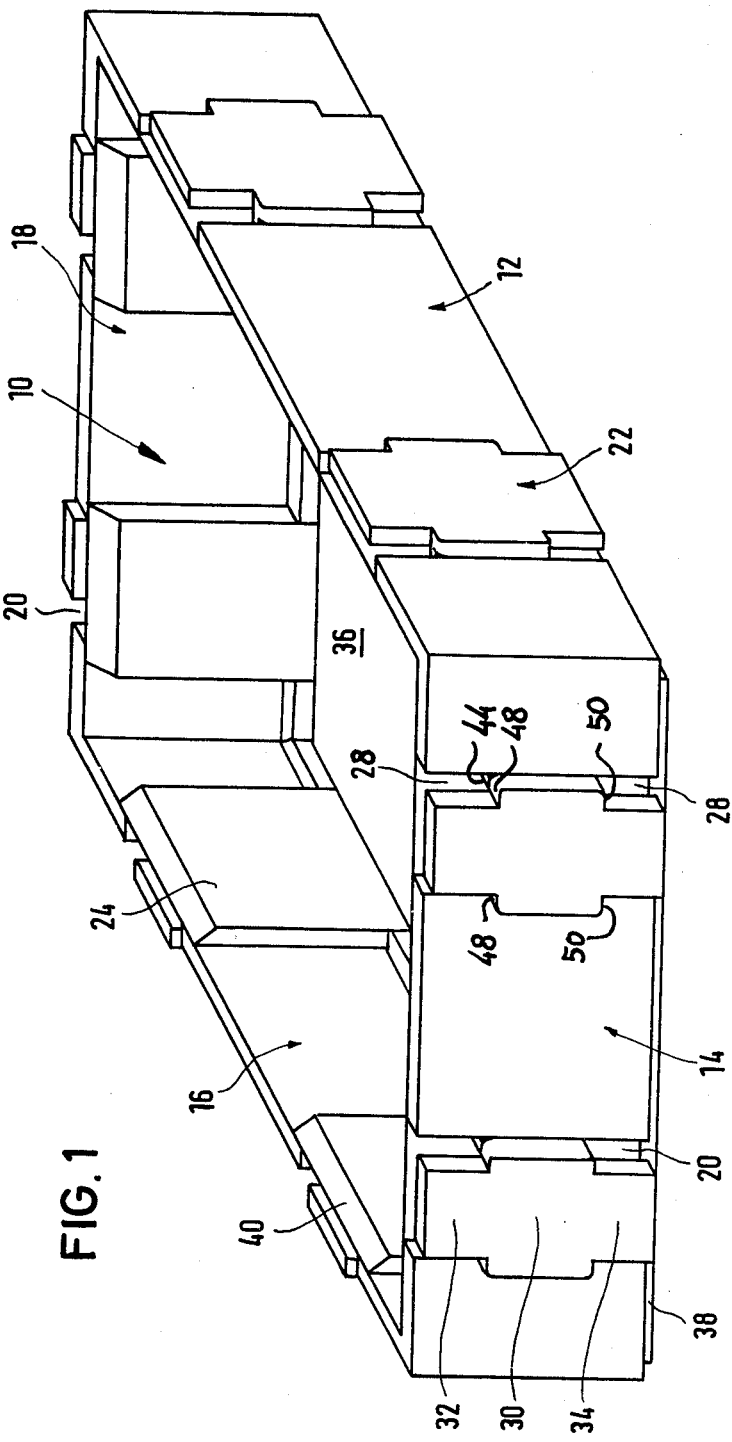
FIG. 1 is a perspective view of a planting box.
Figure 2:
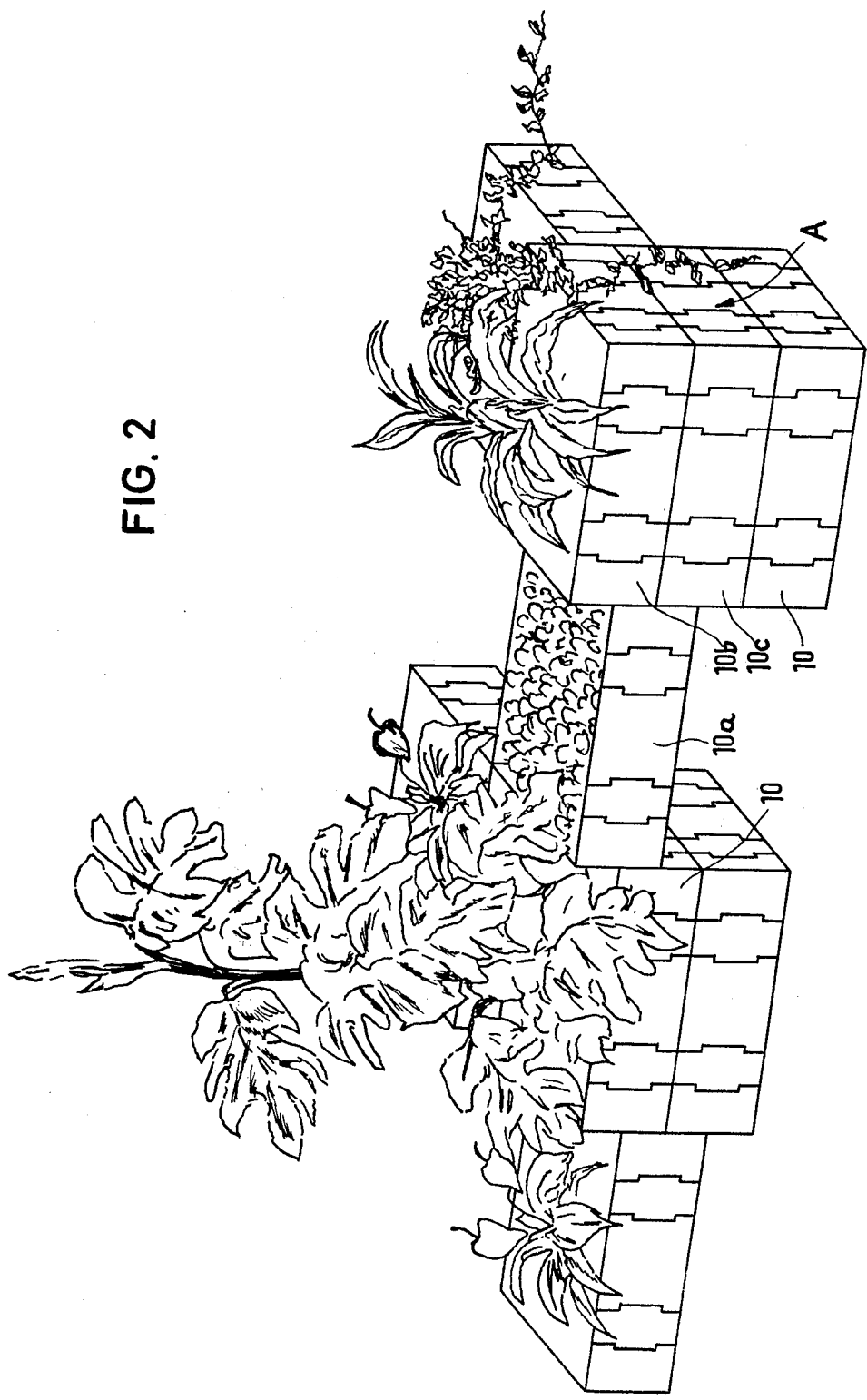
FIG. 2 shows an arrangement of a plurality of identical planting boxes.

The planting box 10 of FIGS. 1 and 2 consists of a rectangular frame having four vertical walls 12, 14, 16, 18. All walls are of equal length so that a square cross-section is formed. Each wall is provided with a pair of channels 20 extending over the whole height of the planting box. The depth of the channels is the same as the thickness of the walls 12, 14, 16, 18. The channels are limited at the outer side of the planting box by front wall portions 22 and at the inner side by rear wall portions 24. The vertical edges of the walls limiting the channels 20 are provided with projections 42 having upper and lower supporting shoulders 44, 46 respectively. The supporting shoulders 44, 46 have the same spacing from the horizontal middle plane of the planting box. The vertical length of the projections 42 is half of the height of the planting box.

The front wall portions 22 comprise a middle part 30 having a width which is equal with the width of the channel 20. The middle part 30 lies symmetrically to the horizontal middle plane of the planting box, that means the distances of the upper edge and the lower edge of the middle part 30 from that middle plane are equal. The vertical height of the middle part 30 is equal with the sum of the distance between the upper shoulder 44 and the upper edge of the planting box and the distance between the lower shoulder 46 and the lower edge of the planting box. At the middle part 30 of the rib or front wall portion 22 are added an upper end part 32 and a lower end part 34. The upper and lower end parts 32, 34 are of a reduced width and are limited by lateral recesses 28 beginning at the upper and lower edges of the front wall portions 22 respectively. The width of the recesses 28 is equal with the lateral extension of the projections 42. The vertical length of the recesses is equal with half of the length of the projections 42. Therefore between the upper narrower part 32 of the front wall portion 22 and the broader middle part 30 upper supporting shoulders 48 are present and lower supporting shoulders 50 are formed between the broader part 30 and the lower narrower part 34 of the front wall portion 22.

The planting boxes 10 can be assembled such that the arrangement A of FIG. 2 is obtained in which each two laterally neighboured boxes are offset with respect to one another by half of the box height. The lower parts 34 of the ribs 22 or front wall portions of one planting box are inserted into the channels 20 of the laterally associated planting box situated on a lower level. The lower parts 34 are received in the narrower channel region between the projections 42. The lower edge of the rib or front wall portion lies in the horizontal middle plane of the planting box and contacts the upper edge of a front wall portion 22 of a lower planting box the wall portion being inserted into the channel 20 from below. The lower supporting shoulders 50 of the front wall portion 22 of the planting box 10a are supported on the upper supporting shoulders 44 of the projections 42 of the planting box 10c. The lower supporting shoulders 46 of the projections 42 of the planting box 10b are supported on the upper shoulders 48 of the front wall portion 22 of the planting box 10a. In this way all hollow spaces of the channels 20 of the planting boxes 10b, 10c in the region of the height of planting box 10a are filled by the front wall portion of this planting box 10a and secure engagement is obtained even allowing a projecting or hang-over arrangement of the planting box 10a.

Only the lowest planting box of each column consisting of a plurality of superposed planting boxes is provided with a bottom 36.

Each planting box 10 is provided with a staple edge 38 or stacking edge inwardly and downwardly extending under an oblique angle and co-operating with inclined surfaces 40 of the rear wall portions 24 in order to form an aligned vertical column.

Figure 4:
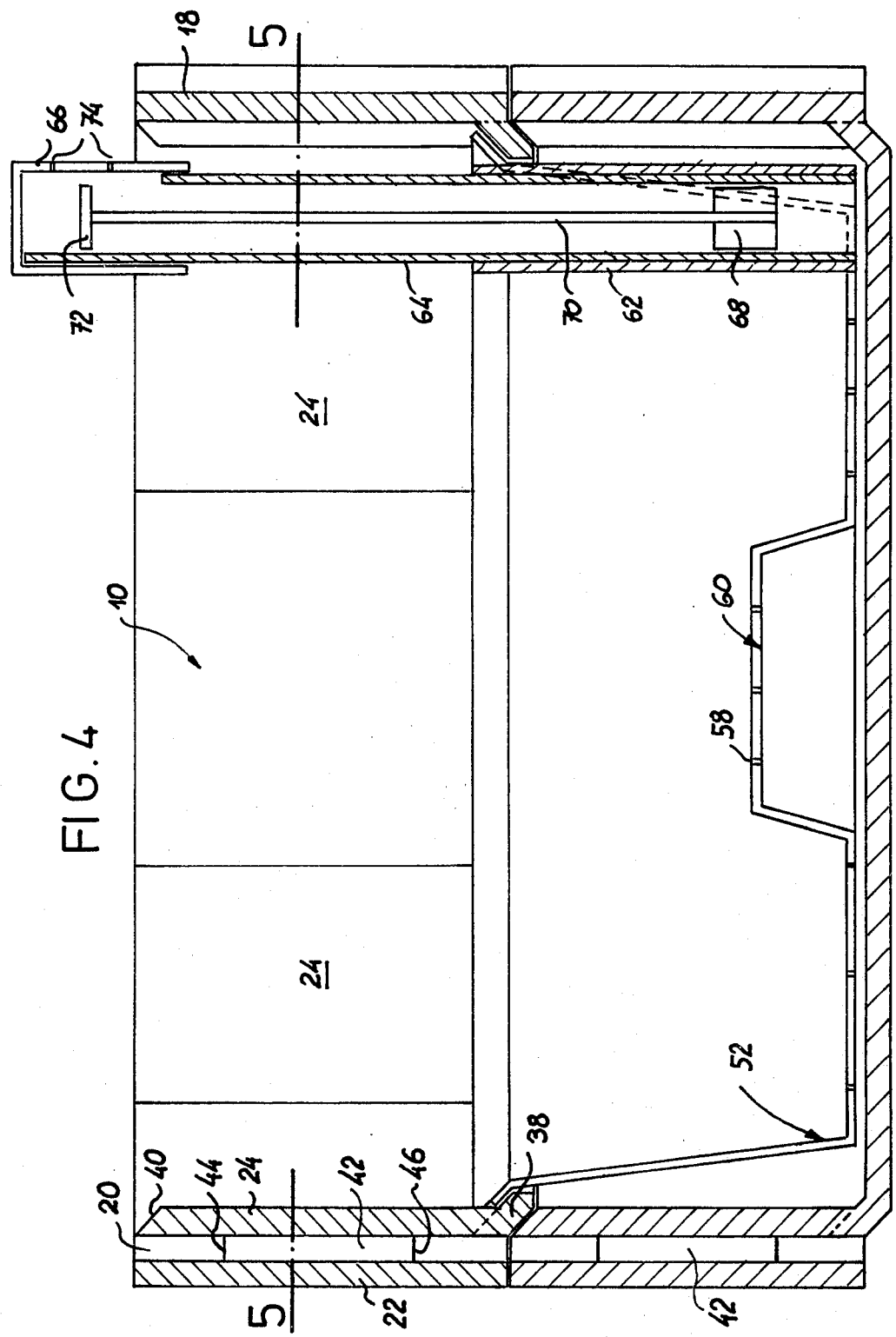
FIG. 4 is a vertical cross-section passing along line 4—4 of FIG. 5 and showing two superposed planting boxes.
Figure 5:
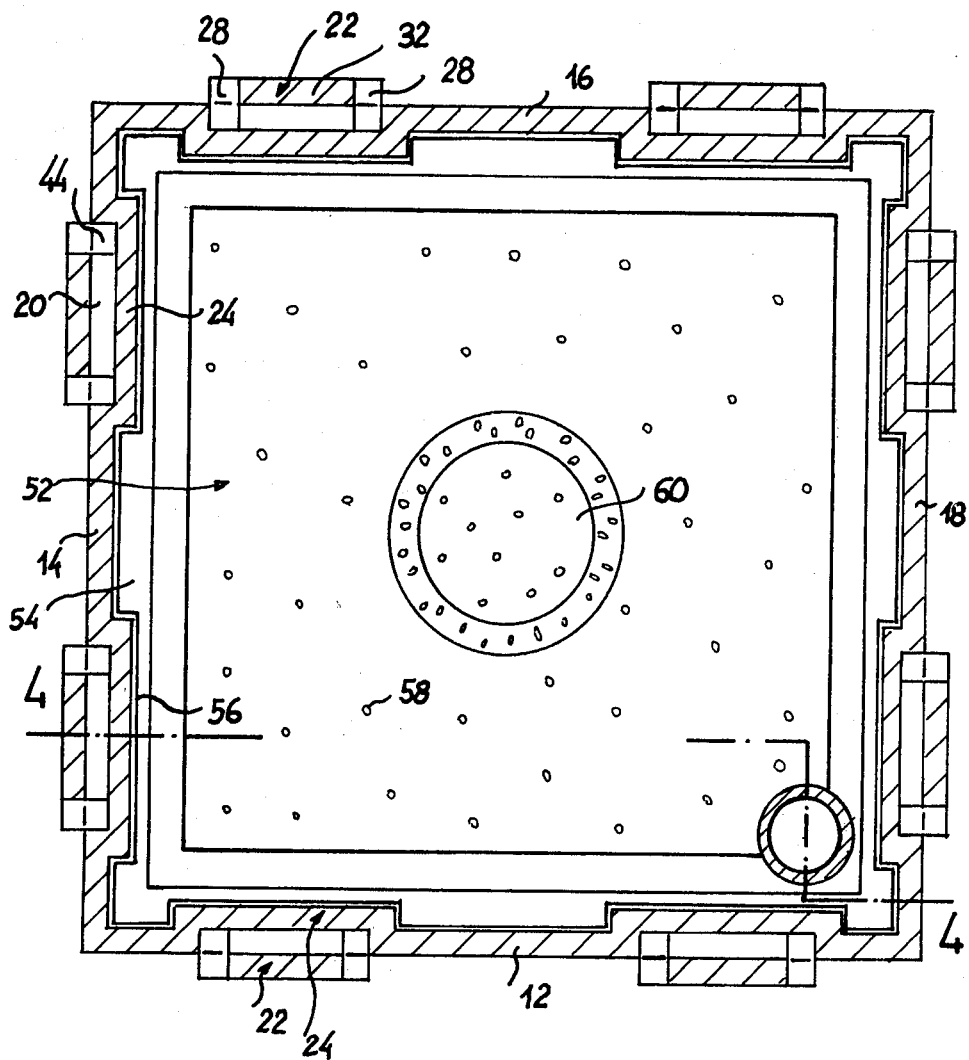
FIG. 5 is a horizontal cross-sectional view of a planting box arrangement taken along line 5—5 of FIG. 4.

In FIGS. 4 and 5 a pot-like insert 52 is shown having an upper outer suspension edge 54 which is provided with a plurality of recesses 56 corresponding in width and disposition to the rear wall portions 24 of the planting box, so that the suspension edge 54 is supported by the bottom edge 38 of a planting box 10 and the insert is suspended into the next lower planting box 10. This insert 52 is filled with granulated clay for hydro-cultures and is provided with openings 58 through which water can pass from the space between the insert and the planting box into the inner chamber filled with the granulated clay. In the centre of the insert 52 a reverse cup-like recess 60 is formed into which a nutrient preparation can be placed.

At one corner of the pot-like insert 52 a supporting tube 62 is formed extending in vertical direction and used to receive a tube 64 extending over the height of a plurality of planting boxes 10 and being provided with a recess at its upper end. This recess is covered by a cup-like head 66 formed of transparent plastics. In the interior of the tube 64 a float body 68 is displaceably arranged at which a thin rod 70 is fastened carrying an indicator element 72 at its upper end. The height of the indicator element indicates the water level in the lowest planting box 10. Openings 74 are provided in head 66 to permit the passage of water.

Figure 3:
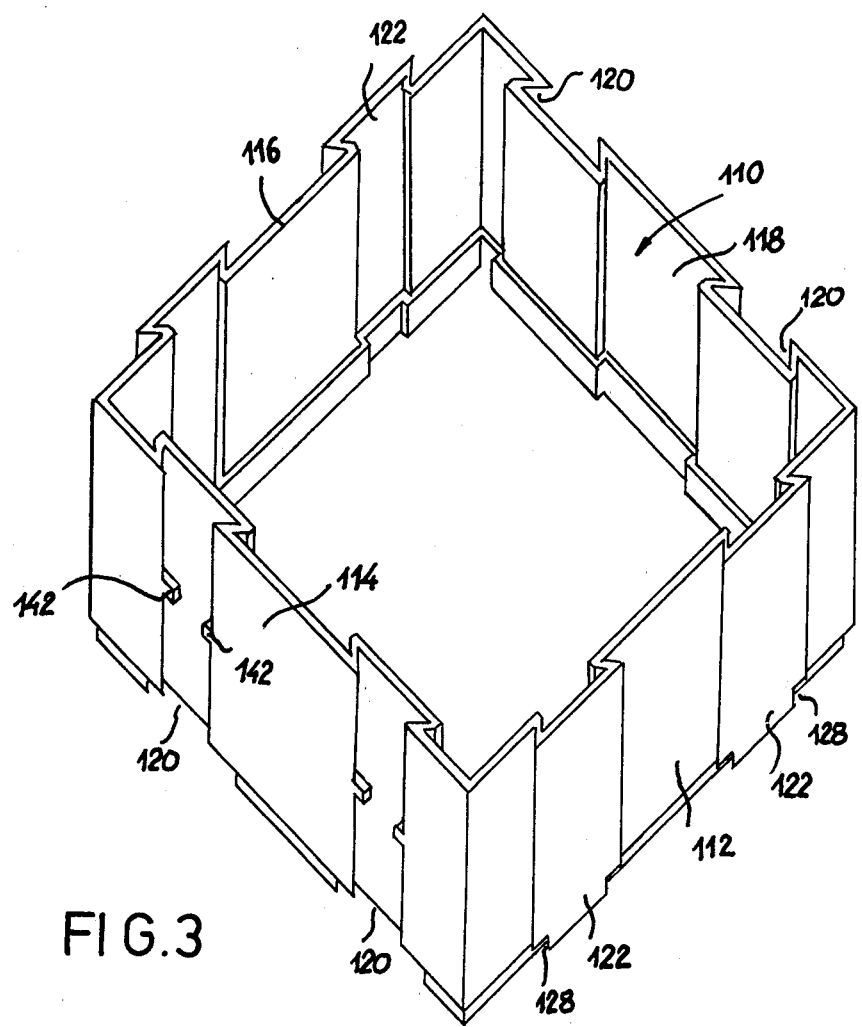
FIG. 3 is a perspective view of a second embodiment of the planting boxes.

FIG. 3 shows a second embodiment of a planting box 110 consisting of the walls 112, 114, 116 and 118. Each of the walls 112 and 116 is provided with a pair of ribs 122. The walls 114 and 118 have channels 120 respectively, the disposition of which corresponds to that of the ribs 122 and the cross-section of which is complementary to that of the ribs 122, so that the ribs of one planting box fit into the channels of a neighboured planting box 110. Substantially in the horizontal middle plane of the planting box 110 projections 142 are provided within the channels 120. Upper and lower supporting shoulders are formed at the projections 142. These supporting shoulders correspond to the shoulders 44, 46 of the projection 42 of FIGS. 1 and 2. However, the vertical extension of the projections 142 is much less than that of the projections 42. Ribs 122 are provided with recesses 128 at their lower edge which are complementary with the projections 142, so that the lower surfaces of these recesses 128 form supporting shoulders which rest on the shoulders of the projections 142 if two planting boxes 110 are connected with one another as described above.

Instead of using a pair of projections 142 one horizontal bridge can be used extending over the whole width of the channel 120. In this case the ribs 122 would have only one recess extending over the whole width of the rib.

In the embodiment shown in FIG. 3 the ribs and channels are of dovetailed cross-section. It should be noted however, that also other vertical guides for example of T-shaped cross-section can be used.

The above mentioned planting boxes are produced by moulding.

What I claim is:

1. An improved planting box assembly being formed of a plurality of individual planting boxes each being stacked upon one another, said boxes are formed by a frame having a polygonal cross-section with vertical walls, vertical ribs and vertical channels at said walls; said ribs and channels are formed of a complementary cross-section; said channels being formed of a pair of individual planting boxes stacked one upon another to define vertical slide guides for ribs of another planting box, enabling lateral connection of respective planting boxes of identical shape; supporting means arranged in each of the said channels defining structure to support said ribs, said improvement comprising: disposing a planting box vertically in an offset position with respect to a first planting box, by half of the height of the other planting boxes; each individual planting box having a lower edge portion formed at each vertical wall, a lower one of a given pair of planting boxes having a bottom wall connected with the lower edge portion; a pot-like insert having an outer edge portion at its upper end, disposed on the lower edge portion of an upper one of said pair of planting boxes, said insert having an overall height which is at least equal to the interior height of the respective planting boxes; a bottom portion of the pot-like insert being disposed to be spaced from a bottom of the lower one of said pair of planting boxes; a plurality of small openings and recess means of a reverse cup-like shape formed in said insert adapted to retain a solid nutrient preparation therein; and a vertical tube formed at the inner side of one side wall of said pot-like insert and an extension tube extending over the whole height of a plurality of planting boxes stacked one upon another, for insertion into the vertical tube to thereby receive a displaceably arranged float body connected by a vertical rod and an indicator element disposed at an upper end of the vertical rod, the indicator element being surrounded by a sleeve-like head of transparent material fitted over an upper end of the extension tube.

* * * * *